United States Patent
Slaats et al.

(10) Patent No.: US 10,266,144 B2
(45) Date of Patent: Apr. 23, 2019

(54) VEHICLE AIRBAG SYSTEM

(71) Applicant: Nissan North America, Inc., Franklin, TN (US)

(72) Inventors: Paul Slaats, Ann Arbor, MI (US); Joyce Lam, Commerce Township, MI (US)

(73) Assignee: Nissan North America, Inc., Franklin, TN (US)

( * ) Notice: Subject to any disclaimer, the term of this patent is extended or adjusted under 35 U.S.C. 154(b) by 43 days.

(21) Appl. No.: 15/619,037

(22) Filed: Jun. 9, 2017

(65) Prior Publication Data

US 2018/0354446 A1    Dec. 13, 2018

(51) Int. Cl.
| | | |
|---|---|---|
| *B60R 21/21* | (2011.01) | |
| *B60R 21/203* | (2006.01) | |
| *B60R 21/205* | (2011.01) | |
| *B60R 21/213* | (2011.01) | |
| *B60R 21/231* | (2011.01) | |
| *B60R 21/232* | (2011.01) | |
| *B60R 21/00* | (2006.01) | |
| *B60R 21/16* | (2006.01) | |

(52) U.S. Cl.
CPC .......... *B60R 21/213* (2013.01); *B60R 21/203* (2013.01); *B60R 21/205* (2013.01); *B60R 21/21* (2013.01); *B60R 21/232* (2013.01); B60R 2021/0009 (2013.01); B60R 2021/0023 (2013.01); B60R 2021/161 (2013.01); B60R 2021/23107 (2013.01)

(58) Field of Classification Search
CPC .... B60R 2021/0009; B60R 2021/0023; B60R 2021/161; B60R 2021/23107; B60R 21/203; B60R 21/205; B60R 21/21; B60R 21/213; B60R 21/232

See application file for complete search history.

(56) References Cited

U.S. PATENT DOCUMENTS

| 8,636,301 B1 * | 1/2014 | Wang | B60R 21/232 280/730.2 |
| 8,764,053 B1 * | 7/2014 | Dix | B60R 21/203 280/729 |

(Continued)

FOREIGN PATENT DOCUMENTS

| EP | 1541426 B1 | 4/2007 |
| WO | 2012-111073 A1 | 8/2012 |

*Primary Examiner* — Laura Freedman
(74) *Attorney, Agent, or Firm* — Global IP Counselors, LLP

(57) ABSTRACT

An airbag system has a curtain airbag, a first airbag and an airbag guiding member. The curtain airbag is installed along an A-pillar or a roof structure within a passenger compartment and deploys covering at least a window section of a door and a portion of the A-pillar. The first airbag is installed to a forward structure within the passenger compartment and deploys to an inflated orientation covering at least a portion of the forward structure. The airbag guiding member is installed to a side area of the forward structure adjacent to the door, a forward area of the door adjacent to the A-pillar or the A-pillar. The airbag guiding member moves to a position in which the airbag guiding member urges the curtain airbag and the first airbag into contact with one another as the curtain airbag and the first airbag move to their respective inflated orientations.

11 Claims, 8 Drawing Sheets

(56) References Cited

U.S. PATENT DOCUMENTS

| | | | | |
|---|---|---|---|---|
| 8,899,617 B2* | 12/2014 | Fukawatase | ........... | B60R 21/232 |
| | | | | 280/730.2 |
| 8,967,660 B2* | 3/2015 | Taguchi | ................ | B60R 21/233 |
| | | | | 280/729 |
| 8,998,250 B2* | 4/2015 | Kruse | ................... | B60R 21/232 |
| | | | | 280/729 |
| 9,108,588 B2* | 8/2015 | Fukawatase | ........... | B60R 21/233 |
| 9,114,777 B2* | 8/2015 | Fukawatase | ........... | B60R 21/232 |
| 9,156,427 B2* | 10/2015 | Wang | ................... | B60R 21/232 |
| 9,180,834 B1* | 11/2015 | Le | .......................... | B60R 21/231 |
| 9,266,494 B2* | 2/2016 | Wang | ................... | B60R 21/237 |
| 9,272,682 B2* | 3/2016 | Wang | ................... | B60R 21/232 |
| 9,296,360 B2* | 3/2016 | Komamura | ........... | B60R 21/276 |
| 9,469,269 B2* | 10/2016 | Hiruta | .................. | B60R 21/232 |
| 9,527,469 B2* | 12/2016 | Fukawatase | ........... | B60R 21/231 |
| 9,539,978 B2* | 1/2017 | Mazanek | ............... | B60R 21/232 |
| 9,744,936 B2* | 8/2017 | Kruse | .................. | B60R 21/232 |
| 9,862,347 B2* | 1/2018 | Deng | ................... | B60R 21/231 |
| 9,950,686 B2* | 4/2018 | Hiraiwa | ............ | B60R 21/23138 |
| 9,994,184 B2* | 6/2018 | Deng | ................. | B60R 21/0136 |
| 9,994,186 B2* | 6/2018 | Fukawatase | ........... | B60R 21/232 |
| 10,023,148 B2* | 7/2018 | Choi | ...................... | B60R 21/16 |
| 10,023,149 B2* | 7/2018 | Yoshikawa | .......... | B60R 21/0134 |
| 10,040,416 B2* | 8/2018 | Fukawatase | ........... | B60R 21/231 |
| 10,065,593 B2* | 9/2018 | Choi | .................... | B60R 21/232 |
| 2007/0241542 A1 | 10/2007 | Wallace | | |
| 2008/0136144 A1 | 6/2008 | Spahr et al. | | |
| 2014/0203541 A1* | 7/2014 | Wei | ....................... | B60R 21/213 |
| | | | | 280/730.2 |
| 2016/0200281 A1* | 7/2016 | Takeshita | .............. | B60R 21/233 |
| | | | | 280/730.2 |
| 2018/0037188 A1* | 2/2018 | Ohno | .................... | B60R 21/262 |
| 2018/0079382 A1* | 3/2018 | Yoo | ....................... | B60R 21/239 |
| 2018/0162311 A1* | 6/2018 | Moon | ................... | B60R 21/231 |

* cited by examiner

VEHICLE AIRBAG SYSTEM

BACKGROUND

Field of the Invention

The present invention generally relates to a vehicle airbag system. More specifically, the present invention relates to an airbag system that includes an airbag guiding member that moves a curtain airbag and an airbag into contact with one another upon deployment.

Background Information

Recent oblique vehicle impact tests have been developed. These tests include subjecting a vehicle to impacts where the direction of impact energy imparted to the vehicle has a direction vector that is neither perpendicular to the vehicle longitudinal direction nor parallel to the vehicle longitudinal direction. Rather, the direction of the impacting forces act on the vehicle at an angle that is oblique relative to the vehicle longitudinal and vehicle lateral directions.

SUMMARY

One object of the present disclosure is to provide a vehicle with an airbag guiding member that urges a curtain airbag and an airbag within a passenger compartment into firm contact with one another during deployment.

In view of the state of the known technology, one aspect of the present disclosure is to provide a vehicle airbag system with a vehicle body structure, a curtain airbag, a first airbag and an airbag guiding member. The vehicle body structure defines a passenger compartment and includes an A-pillar, a roof structure, a forward structure of the passenger compartment and a door that moves between an open orientation exposing the passenger compartment and a closed orientation that conceals at least a portion of the passenger compartment. The curtain airbag is installed to the vehicle body structure within the passenger compartment along at least one of the A-pillar and the roof structure. The curtain airbag is configured to move from a stowed orientation concealed along the at least one of the A-pillar and the roof structure, to an inflated orientation covering at least a window section of the door and a portion of the A-pillar. The first airbag is installed to the forward structure within the passenger compartment. The first airbag is configured to move from a stowed orientation concealed within the forward structure, to an inflated orientation covering at least a portion of the forward structure. The airbag guiding member is installed to one of a side area of the forward structure adjacent to the door, a forward area of the door adjacent to the A-pillar and the A-pillar. The airbag guiding member is configured to move from a stowed orientation along one of the side area of the forward structure, the forward area of the door and the A-pillar, to a deployed orientation in which the airbag guiding member is positioned to guide the curtain airbag and the first airbag into contact with one another as the curtain airbag and the first airbag move to their respective inflated orientations upon deployment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
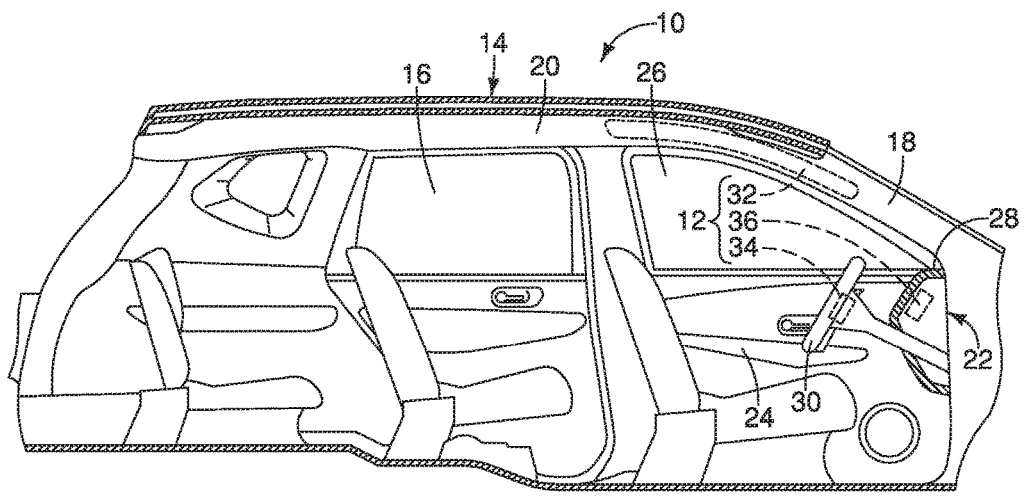
FIG. 1 is a side cross-sectional view of a vehicle that includes an airbag system having a curtain airbag, a first airbag and an airbag guiding member within a passenger compartment of the vehicle shown in a stowed orientation in accordance with a first embodiment.
Figure 2:
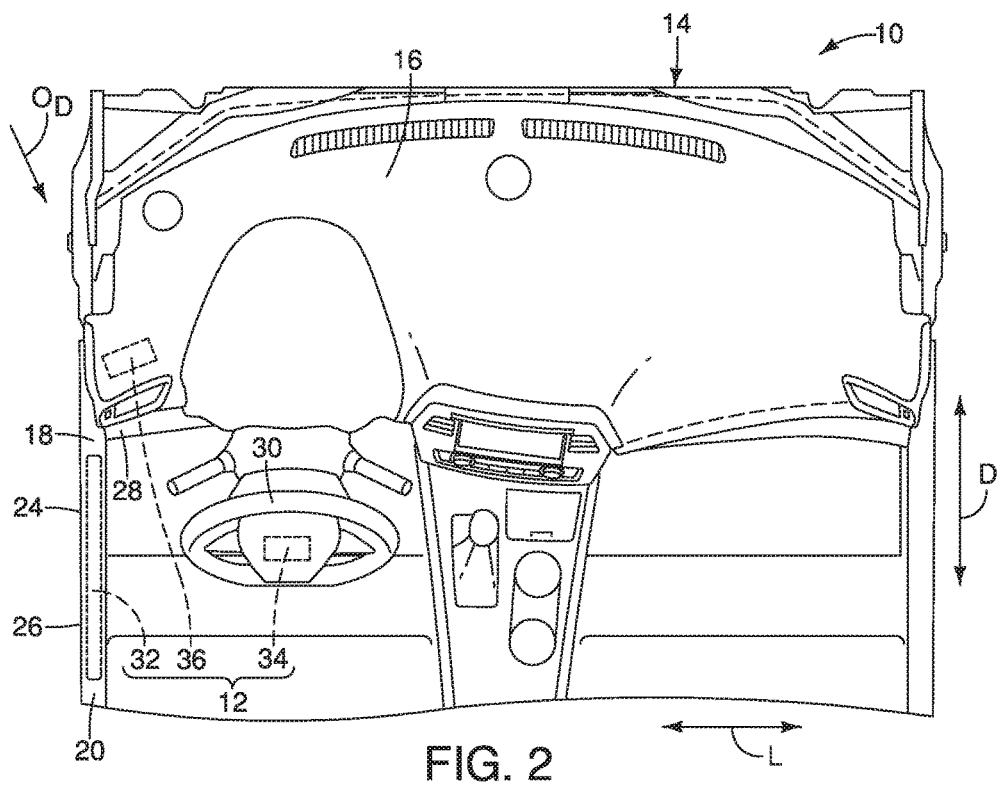
FIG. 2 is a top view of a portion of the passenger compartment of the vehicle depicted in FIG. 1 showing locations of the curtain airbag, the first airbag and the airbag guiding member of the airbag system in the stowed orientation in accordance with the first embodiment.
Figure 3:
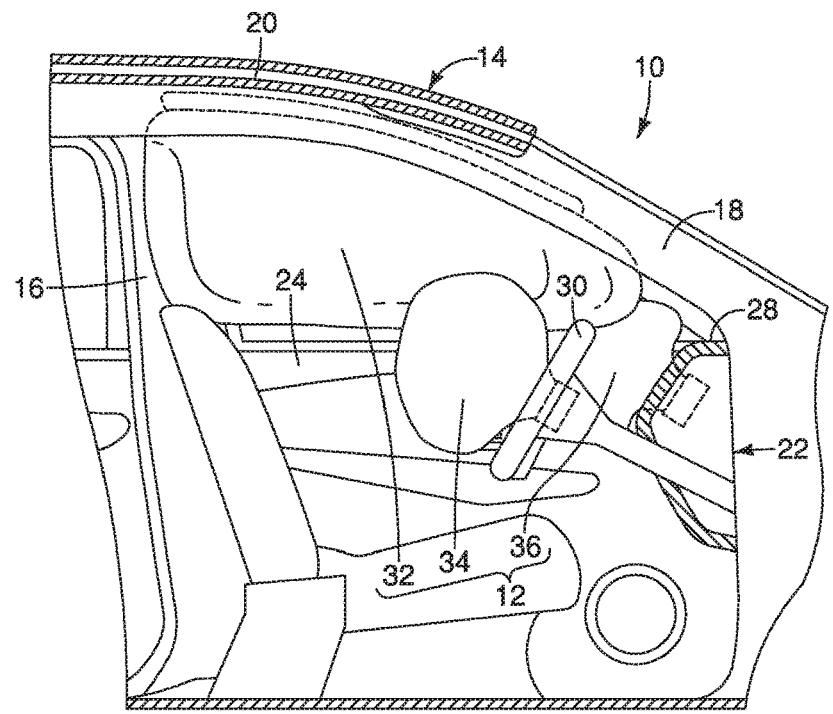
FIG. 3 is another side cross-sectional view of the vehicle showing the curtain airbag, the first airbag and the airbag guiding member of the airbag system in a deployed orientation in accordance with the first embodiment.

Referring initially to FIGS. 1-2, a vehicle 10 that includes a vehicle airbag system 12 is illustrated in accordance with a first embodiment.

The vehicle 10 includes a vehicle body structure 14 that defines a passenger compartment 16 and includes an A-pillar 18, a roof structure 20, a forward structure 22 within the passenger compartment 16. The vehicle body structure 14 further includes a door 24 that moves between an open orientation (not shown) exposing the passenger compartment 16 and a closed orientation (FIGS. 1 and 2) that conceals at least a portion of the passenger compartment 16. The door 24 includes a window 26. The vehicle 10 further defines various directions, such as a vehicle longitudinal direction D, and a vehicle lateral direction L, perpendicular to the vehicle longitudinal direction D, as shown in FIG. 2.

The forward structure 22 is herein defined structures located in a forward area of the passenger compartment 16. The vehicle body structure 14 includes an instrument panel 28 and a steering column 30. The instrument panel 28 and the steering column 30 are both forward structures 22 of the vehicle 10. Since vehicle body structures, such as instrument panels, steering columns, doors and windows are conventional vehicle structures and features, further description is omitted for the sake of brevity.

The vehicle airbag system 12 includes a curtain airbag 32, a first airbag 34 and an airbag guiding member 36. As shown in FIGS. 1 and 2, the curtain airbag 32 installed to the vehicle body structure 14 within the passenger compartment 16 along an upper portion of the A-pillar 18 and a forward portion of the roof structure 20. However, it should be understood from the drawings and the description herein that the curtain airbag 32 can alternatively be installed along the A-pillar 18, but not extend along the roof structure 20. Still further, the curtain airbag 32 can alternatively be installed along the roof structure 20 but not extend along the A-pillar 18. The installation location of the curtain airbag 32 depends upon the overall design of the vehicle 10. For example, in some vehicle designs, it is more advantageous for the curtain airbag 32 to be installed only to the roof structure 20 or, only to the A-pillar 18. In determining the installation location of the curtain airbag, one consideration is the need for the curtain airbag 32 to cover the window 26 upon deployment.

The curtain airbag 32 is configured to move from a stowed orientation (FIGS. 1 and 2) concealed under a trim panel (not shown) along one, the other, or both of the A-pillar 18 and the roof structure 20, to an inflated orientation (FIGS. 3-6) covering at least a window 26 (a window section) of the door 24 and optionally a portion of the A-pillar 18. In the inflated orientation (a deployed orientation), the curtain airbag 32 creates a cushion between a passenger and the window 26 of the door 24.

The first airbag 34 is installed to one of the forward structures 22 within the passenger compartment 16. In the first embodiment, the forward structure 22 is the steering column 30. Specifically, in the first embodiment, the first airbag 34 is installed within a central area of the steering wheel of the steering column 30. The first airbag 34 is configured to move from a stowed orientation (FIGS. 1 and 2) concealed within steering column 30 (the forward structure), to an inflated orientation (FIGS. 3-6) covering a rearward side of the steering wheel of the steering column 30 (the forward structure). In the inflated orientation, the first airbag 34 defines a cushion between the steering column 30 and a passenger seated behind the steering column 30.

Alternatively, the first airbag 34 can be installed to the instrument panel 28 within the passenger compartment 16, and covered by a frangible or releasable trim panel (not shown). For example, the vehicle airbag system 12 can be installed to the passenger's side of the passenger compartment 16, where there is no steering column. The steering column 30 is only located at the driver's side of the passenger compartment 16. Consequently, the first airbag 34 can be directly installed with a concealed compartment of the instrument panel 28, centered in front of an area of a passenger seat within the passenger compartment 16.

The airbag guiding member 36 is configured to move from a stowed orientation to a deployed orientation in which the airbag guiding member 36 is positioned to guide the curtain airbag 32 and the first airbag 34 into contact with one another as the curtain airbag 32 and the first airbag 34 move to their respective inflated orientations upon deployment. The airbag guiding member 36 can include any of a variety of structures, however, in the first embodiment, the airbag guiding member 36 is another airbag, hereinafter referred to as a supplemental airbag 36.

The supplemental airbag 36 (the airbag guiding member 36) is installed to any of a variety of structures within the vehicle 10, such as a forward area of the door 24 adjacent to the A-pillar 18, on the A-pillar 18, or within the instrument panel 28 adjacent to the A-pillar 18. In the first embodiment, the supplemental airbag 36 is installed to an area of the instrument panel 28 above a forward portion of the steering column 30, and, adjacent to the A-pillar 18 and the door 24, as shown in FIGS. 1-6. Although not shown, in the stowed orientation, the supplemental airbag 36 is concealed by a frangible trim element that blends in with the overall appearance of the instrument panel 28.

Figure 7:
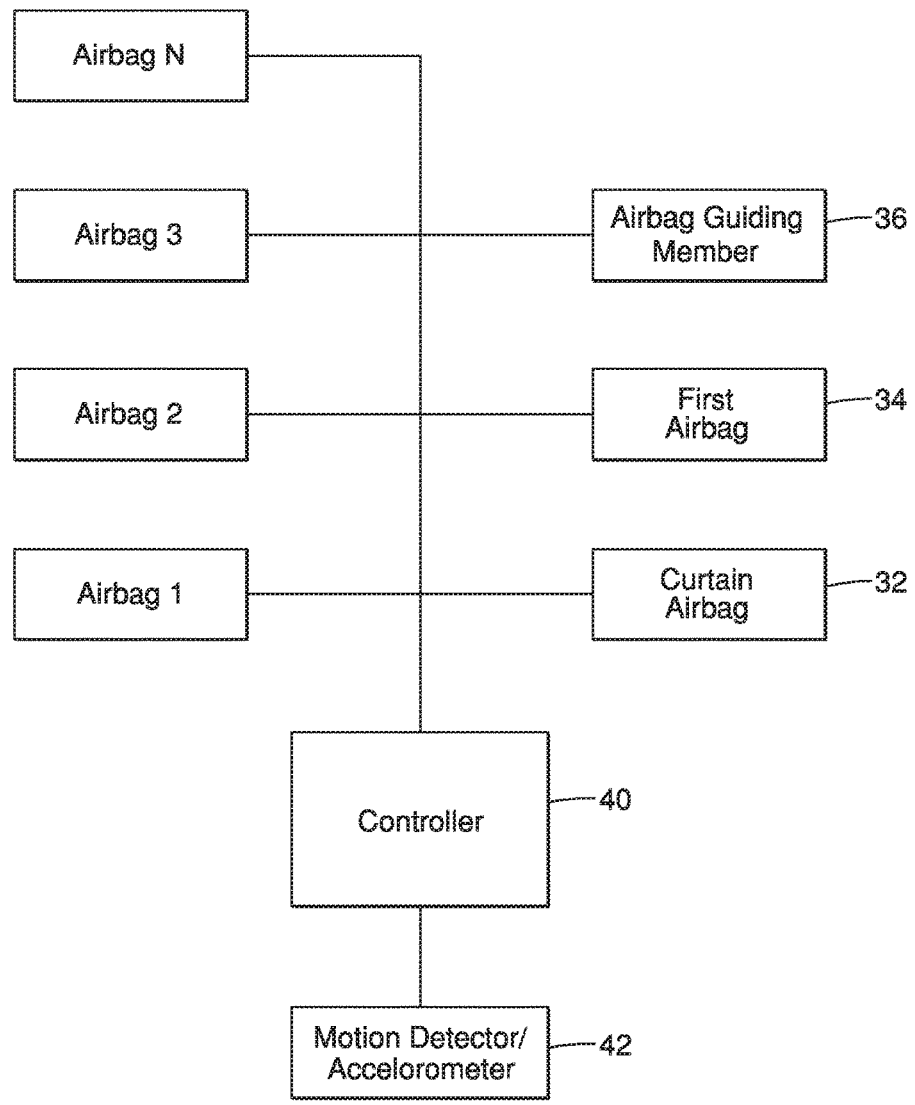
FIG. 7 is a block diagram of a portion of the airbag system showing a controller that control operation of the airbag system, and airbags connected to the controller in accordance with the first embodiment.

FIG. 7 is a block diagram showing a controller 40 that is connected to a sensor 42, airbags 1 through N, the curtain airbag 32, the first airbag 34 and the airbag guiding member 36 (the supplemental airbag 36).

The controller 40 preferably includes a microcomputer with an airbag deployment control program that controls the deployment of the airbags 1-N, the curtain airbag 32, the first airbag 34 and the airbag guiding member 36. The controller 40 can also include other conventional components such as an input interface circuit, an output interface circuit, and storage devices such as a ROM (Read Only Memory) device and a RAM (Random Access Memory) device. The microcomputer of the controller 40 is programmed to control the airbags 1-N, the curtain airbag 32, the first airbag 34 and the airbag guiding member 36. The memory circuit stores processing results and control programs such as ones for airbag operation that are run by the processor circuit. The controller 40 is operatively coupled to the airbags 1-N, the curtain airbag 32, the first airbag 34, the airbag guiding member 36 and the sensor 42 in a conventional manner. The internal RAM of the controller 40 stores statuses of operational flags and various control data. It will be apparent to those skilled in the art from this disclosure that the precise structure and algorithms for the controller 40 can be any combination of hardware and software that will carry out the functions of the present invention.

The sensor 42 can be a motion detector, an impact sensor and/or an accelerometer. Further, the sensor 42 can represent a plurality of vehicle sensors related to airbag deployment. Specifically, the seats within the vehicle 10 can each include a passenger detecting sensor. Airbags and curtain airbags associated with a specific seat within the vehicle 10 can be activated or deactivated by the controller 40 in response to detection of the presence, or absence of a passenger in a specific seat.

The airbags 1-N are other airbags installed throughout the passenger compartment 16 of the vehicle 10 whose deployment are controlled by the controller 40 in a conventional manner.

In response to the sensor 42 detecting an impact event where the vehicle 10 is contacted by a fixed object or another vehicle above a predetermined velocity or with an impact that is associated with a minimum predetermined level of force, the controller 40 can cause activated ones of the airbags 1-N, the curtain airbag 32, the first airbag 34 and the airbag guiding member 36 to deploy, moving from the stowed orientation to the deployed orientation (inflated orientation).

The controller 40 is configured to determine (based upon input from the sensor 42) whether or not the impact event is a straight head-on or off-center impact where the force applied to the vehicle 10 is in a direction parallel to the vehicle longitudinal direction D. If the impact event is in a direction parallel to the vehicle longitudinal direction D, only activated ones of the airbags 1-N, the curtain airbag 32 and the first airbag 34 are deployed to inflate. However, in response to determining that the impact event is in a direction that is not parallel to the vehicle longitudinal direction D and not parallel to the vehicle lateral direction L, the controller 40 causes activated ones of the airbags 1-N, the curtain airbag 32, the first airbag 34 and the airbag guiding member 36 to deploy (inflate). More specifically, in response to determining that the impact event is in an oblique direction OD (see FIG. 2), the controller 40 causes activated ones of the airbags 1-N, the curtain airbag 32, the first airbag 34 and the airbag guiding member 36 to deploy (inflate).

When the vehicle airbag system 12 is operated such that the curtain airbag 32, the first airbag 34 and the airbag guiding member 36 are all deployed, the curtain airbag 32, the first airbag 34 and the airbag guiding member 36 work together in a specific manner. Specifically, The airbag guiding member 36 (the supplemental airbag 36 in the first embodiment) is configured to move from the stowed orientation to the deployed orientation such that in the deployed orientation the supplemental airbag 36 contacts one or both of the curtain airbag 32 and the first airbag 34, urging them into contact with one another as the curtain airbag 32 and the first airbag 34 move to their respective inflated orientations. Further, the supplemental airbag 36 fills a space defined adjacent to a forward portion of the door 24, the A-pillar 18 and the portion of the instrument panel 28 adjacent to the A-pillar 18, as shown in FIGS. 3-6.

Figure 4:
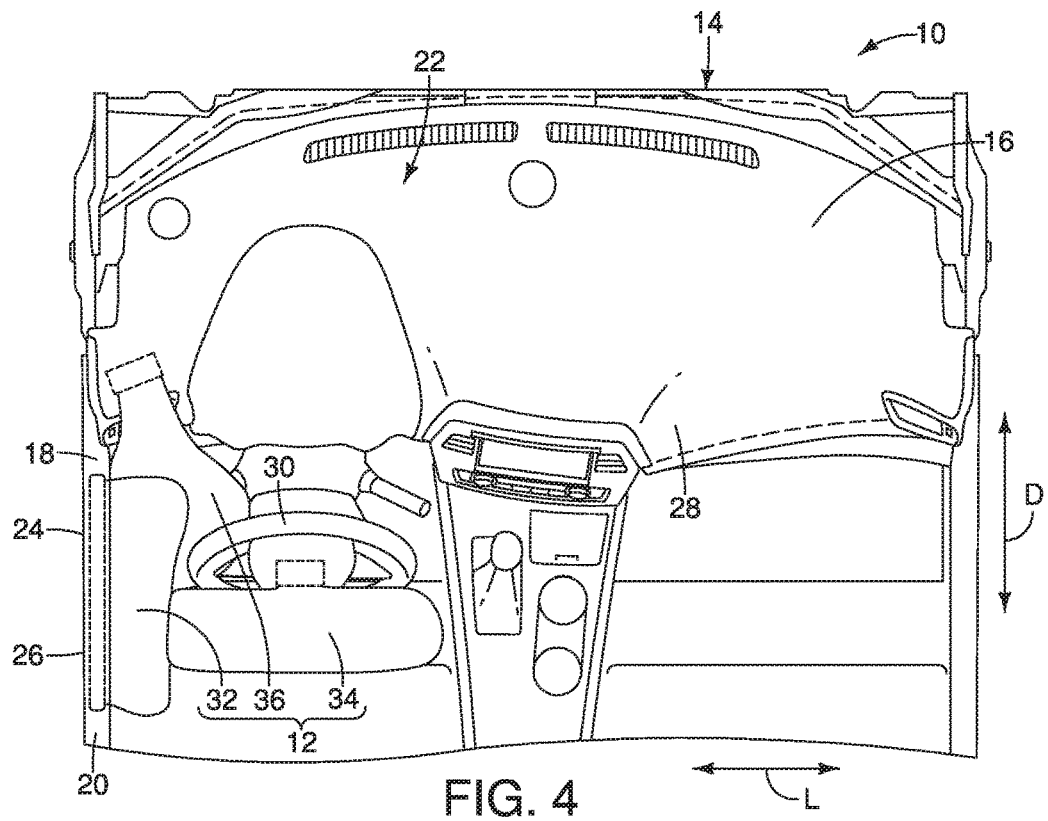
FIG. 4 is another top view of the portion of the passenger compartment of the vehicle depicted in FIG. 2 showing the curtain airbag, the first airbag and the airbag guiding member of the airbag system in the deployed orientation in accordance with the first embodiment.
Figure 5:
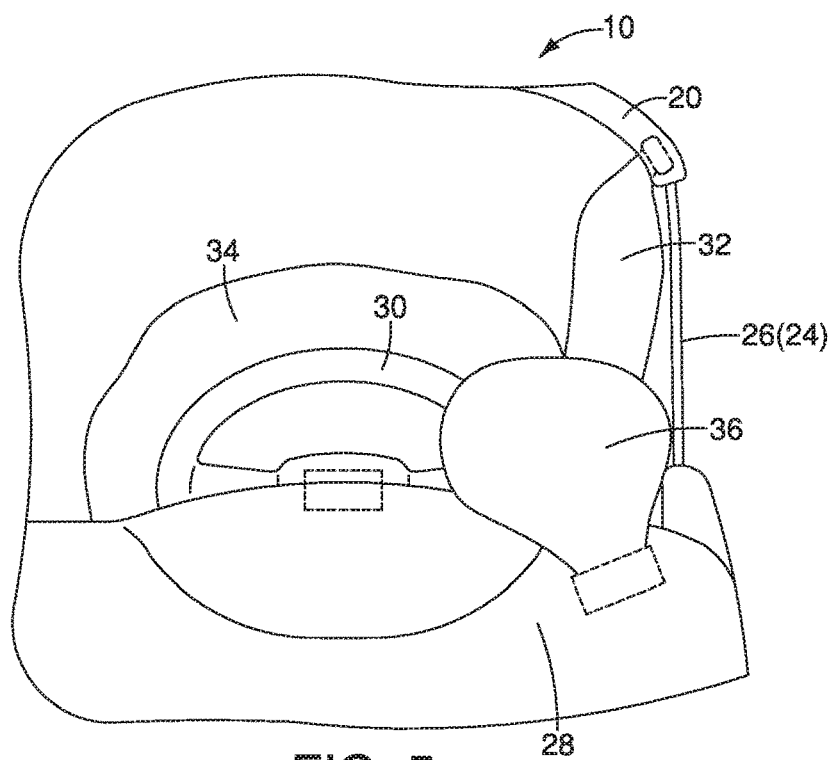
FIG. 5 is a top view of a portion of the passenger compartment around a steering column showing the curtain airbag, the first airbag and the airbag guiding member of the airbag system in the deployed orientation in accordance with the first embodiment.
Figure 6:
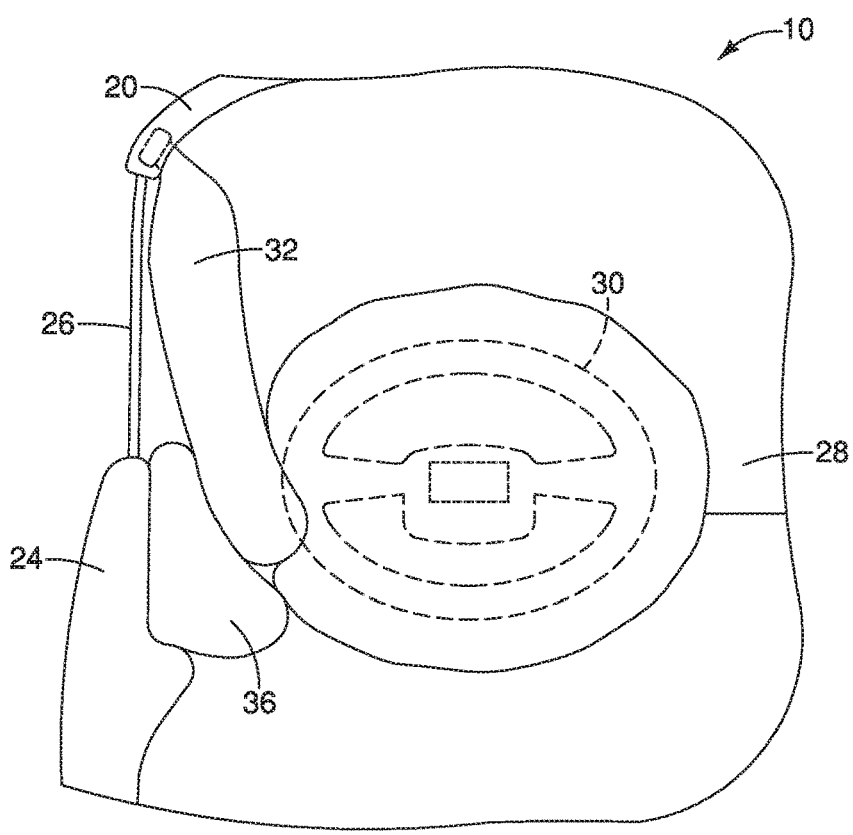
FIG. 6 is a view of the portion of the passenger compartment around a steering column looking in a vehicle forward direction (from the rear of the passenger compartment) showing the curtain airbag, the first airbag and the airbag guiding member of the airbag system in the deployed orientation in accordance with the first embodiment.

For example, as shown from above (looking downward) in FIG. 4 and from the front of the passenger compartment 16 in FIG. 5, the supplemental airbag 36 is below the curtain airbag 32 and forward of the first airbag 34, preventing them from moving into the space defined adjacent to the forward portion of the door 24, the A-pillar 18 and the portion of the instrument panel 28 adjacent to the A-pillar 18. As shown in FIG. 6, at least a portion of the supplemental airbag 36 extends between the inner surface of the door 24 and the curtain airbag 32, forcing the curtain airbag 32 to move against the first airbag 34.

The overall effect of the supplemental airbag 36 is to limit or restrict movement of a passenger forward of the first airbag 34 and toward the door 24, as might occur in response to an impact event in the oblique direction OD. The supplemental airbag 36 is oriented and positioned to urge the curtain airbag 32 and the first airbag 34 into contact with one another. The supplemental airbag 36 is not configured to contact or engage the passenger. While it is possible for a passenger to contact the supplemental airbag 36 during an impact event in the oblique direction OD, the supplement airbag 36 is not intended to do so. Rather, the supplemental airbag 36 is configured to contact the curtain airbag 32 and the first airbag 34, as well as fill a space defined between the A-pillar, the curtain airbag 32 and the first airbag 34, with the curtain airbag 32 and the first airbag 34 moving to and/or in their respective deployed orientations (inflated orientations).

In a modification to the first embodiment, the supplemental airbag 36 can be replaced with a trim panel (not shown) movably attached to the instrument panel 28 at a location adjacent to the A-pillar 18. The trim panel can be deployed such that it moves rearward, pushing against the curtain airbag 32 as the curtain airbag 32 is deployed, thereby causing the curtain airbag 32 to move against the first airbag 34, and fill the space between the A-pillar, the curtain airbag 32 and the first airbag 34 moving to and/or in their respective deployed orientations (inflated orientations).

Second Embodiment

Figure 8:
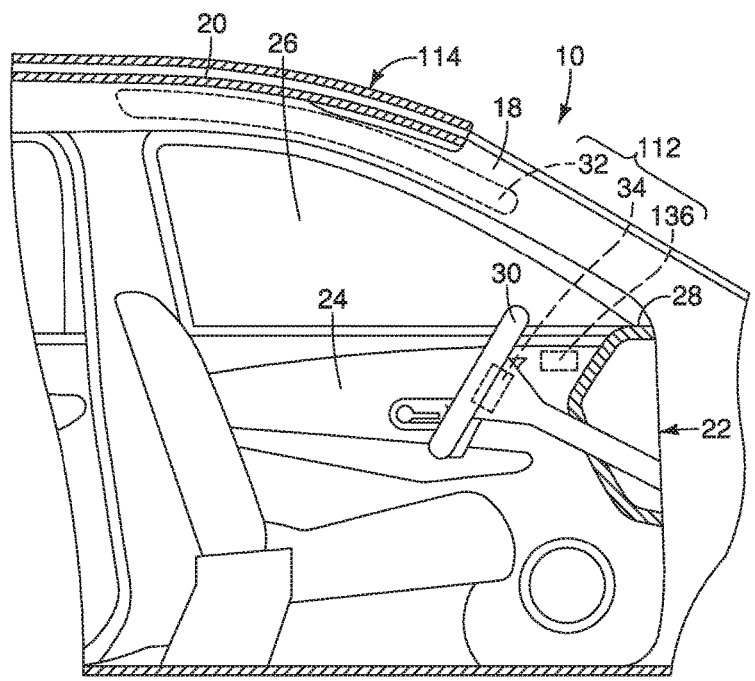
FIG. 8 is a side cross-sectional view of a portion of a vehicle that includes an airbag system having a curtain airbag, a first airbag and an airbag guiding member within a door of the vehicle shown in a stowed orientation in accordance with a second embodiment.
Figure 9:
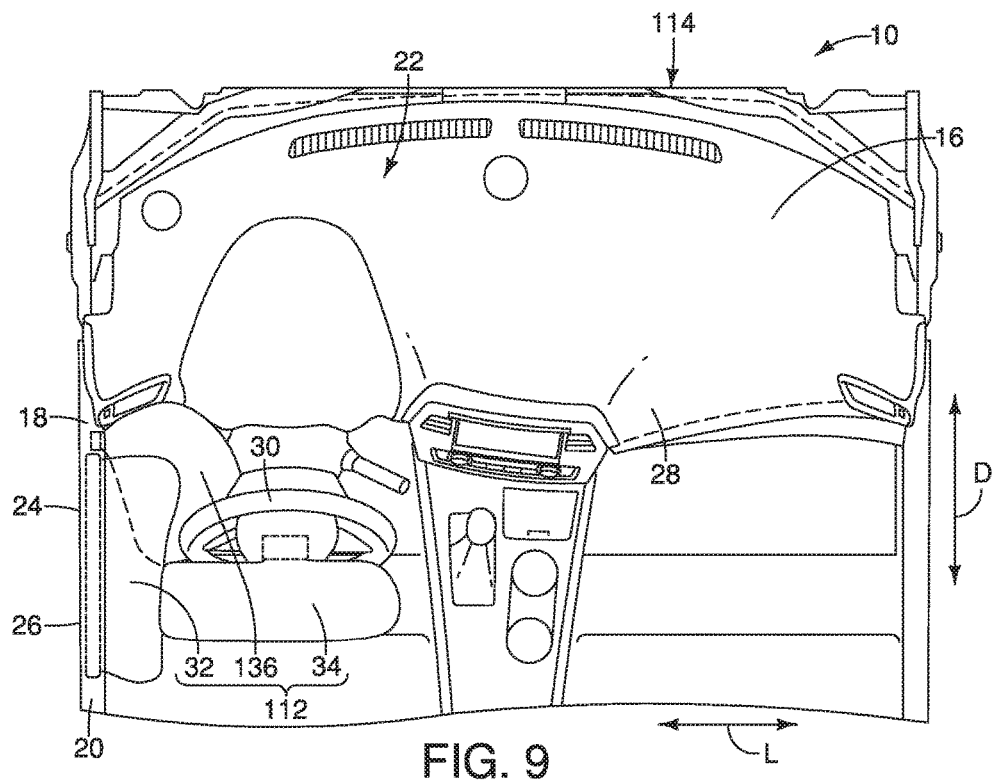
FIG. 9 is a top view of the portion of the passenger compartment of the vehicle depicted in FIG. 8 showing locations of the curtain airbag, the first airbag and the airbag guiding member of the airbag system in the deployed orientation in accordance with the second embodiment.

Referring now to FIGS. 8 and 9, a vehicle body structure 114 of the vehicle 10 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle body structure 114 is equipped with an airbag system 112 that includes the curtain airbag 32, the first airbag 34 and an airbag guiding member 136. The curtain airbag 32 and the first airbag 34 are as described above with respect to the first embodiment. The airbag guiding member 136 is a supplemental airbag, hereinafter referred to as the supplemental airbag 136. In the second embodiment, the supplemental airbag 136 is installed to a forward area of the door 24, adjacent to the window 26 and the A-pillar 18. The supplemental airbag 136 is configured and shaped to deploy in a manner that is similar to the supplemental airbag 36, and have generally the same effects as the supplemental airbag 36 of the first embodiment.

Third Embodiment

Figure 10:
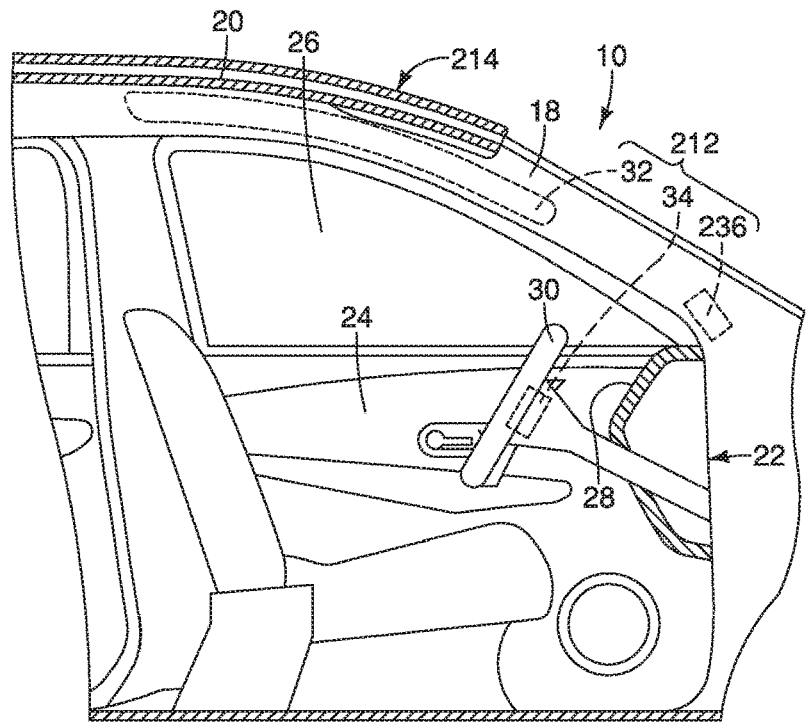
FIG. 10 is a side cross-sectional view of a portion of a vehicle that includes an airbag system having a curtain airbag, a first airbag and an airbag guiding member within an A-pillar of the vehicle shown in a stowed orientation in accordance with a third embodiment.
Figure 11:
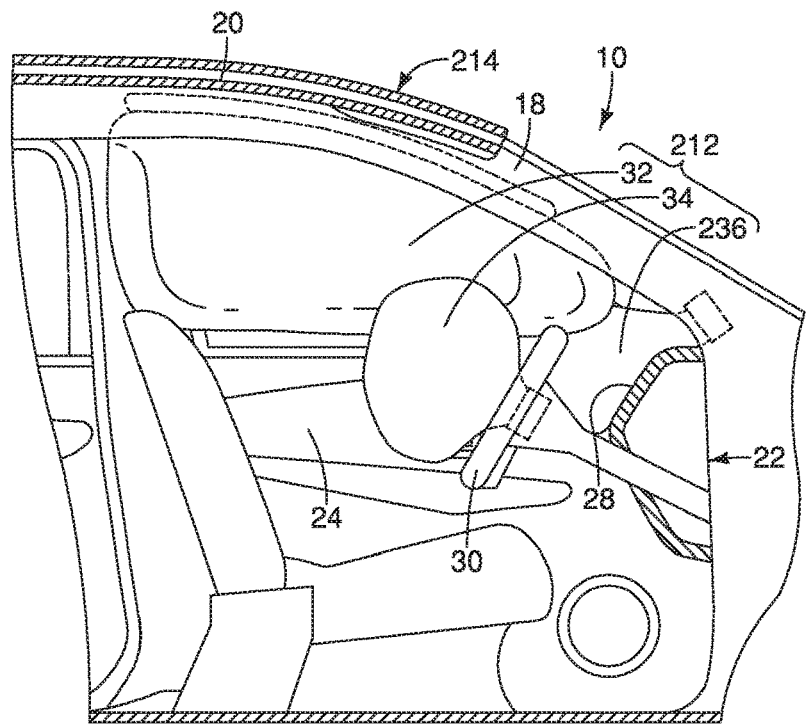
FIG. 11 is another side cross-sectional view of the portion of the passenger compartment of the vehicle depicted in FIG. 10 showing locations of the curtain airbag, the first airbag and the airbag guiding member of the airbag system in the deployed orientation in accordance with the third embodiment.

Referring now to FIGS. 10 and 11, a vehicle body structure 214 of the vehicle 10 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The vehicle body structure 214 is equipped with an airbag system 212 that includes the curtain airbag 32, the first airbag 34 and an airbag guiding member 236. The curtain airbag 32 and the first airbag 34 are as described above with respect to the first embodiment. The airbag guiding member 236 is a supplemental airbag, hereinafter referred to as the supplemental airbag 236. In the third embodiment, the supplemental airbag 236 is installed to the A-pillar 18 adjacent to a forward area of the door 24 and an outboard portion of the instrument panel 28. The supplemental airbag 236 is configured and shaped to deploy in a manner that is similar to the supplemental airbag 36, and have generally the same effects as the supplemental airbag 36 of the first embodiment.

Fourth Embodiment

Figure 12:
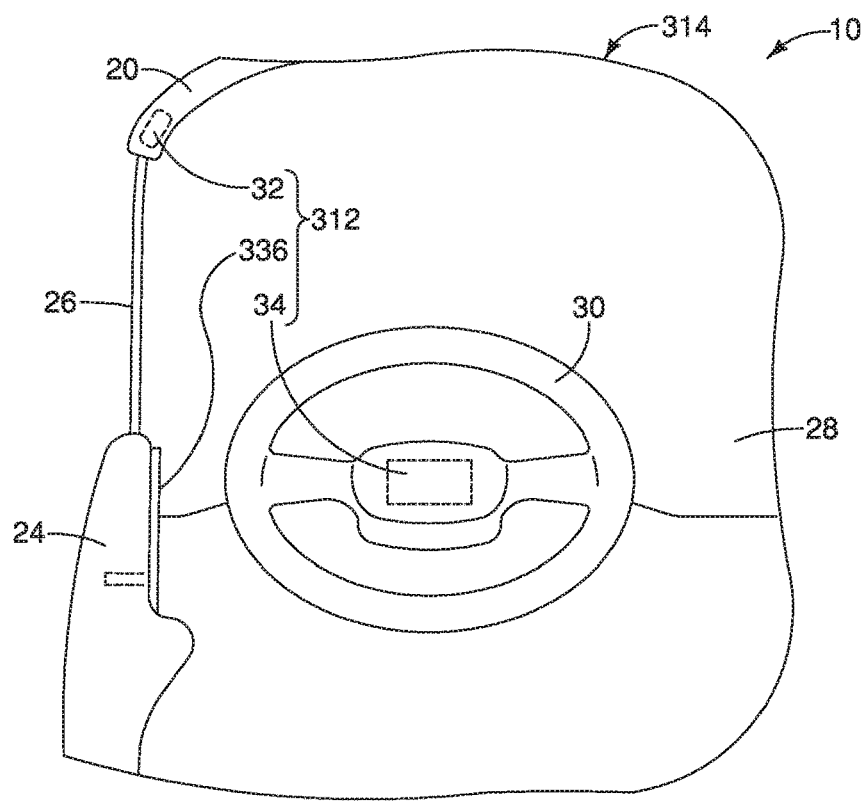
FIG. 12 is a top view of a portion of a vehicle that includes an airbag system having a curtain airbag, a first airbag and an airbag guiding member installed to a door of the vehicle shown in a stowed orientation in accordance with a fourth embodiment.
Figure 13:
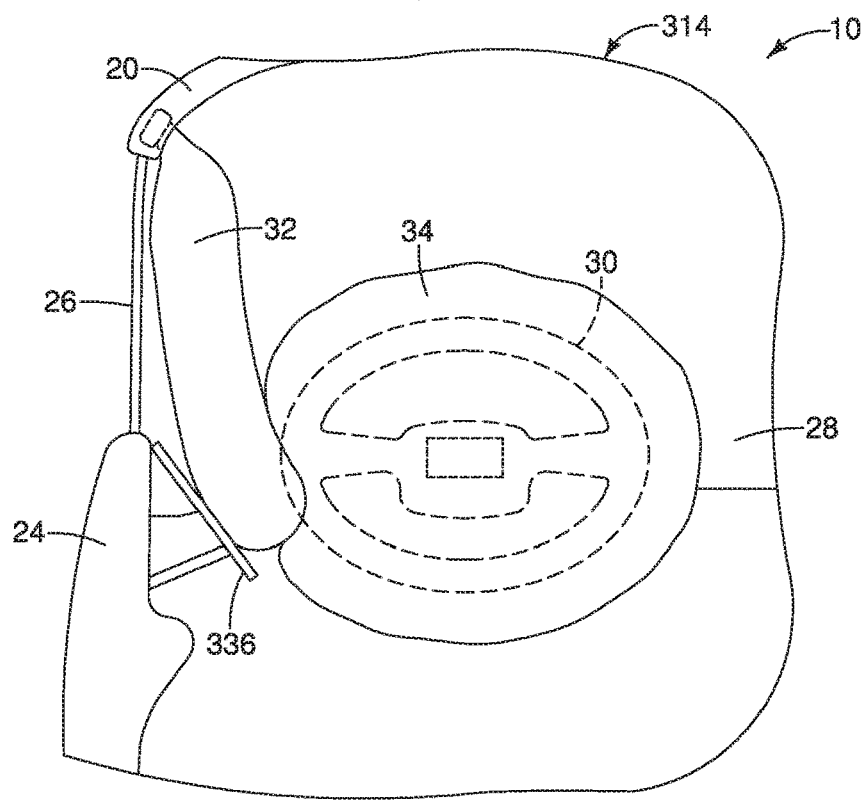
FIG. 13 is another top view of the portion of the passenger compartment of the vehicle depicted in FIG. 12 showing locations of the curtain airbag, the first airbag and the airbag guiding member of the airbag system in the deployed orientation in accordance with the fourth embodiment.

Referring now to FIGS. 12 and 13, a vehicle body structure 314 of the vehicle 10 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The vehicle body structure 314 is equipped with an airbag system 312 that includes the curtain airbag 32, the first airbag 34 and an airbag guiding member 336. The curtain airbag 32 and the first airbag 34 are as described above with respect to the first embodiment. The airbag guiding member 336 is a trim panel attached to an interior surface of the door 24. In the fourth embodiment, the airbag guiding member 336 is configured to deploy along with the curtain airbag 32 and the first airbag 34 such that the airbag guiding member 336 (the trim panel) pushes inboard and upward upon deployment against an outboard side of the curtain airbag 32, causing the curtain airbag 32 to move toward the first airbag 34. The airbag guiding member 336 (the trim panel) has the similar effects as the supplemental airbag 36 of the first embodiment.

In a modification to the fourth embodiment, the airbag guiding member 336 (the trim panel) can alternatively be installed to the A-pillar 18 between the door 24 and the instrument panel 28 and configured such that in the stowed orientation the airbag guiding member 336 (the trim panel) is flush with adjacent surfaces of the A-pillar 18 and in the deployed orientation the airbag guiding member 336 (the trim panel) is moved rearward away from the adjacent surfaces of the A-pillar urging the curtain airbag 32 into contact with the first airbag 34.

Fifth Embodiment

Figure 14:
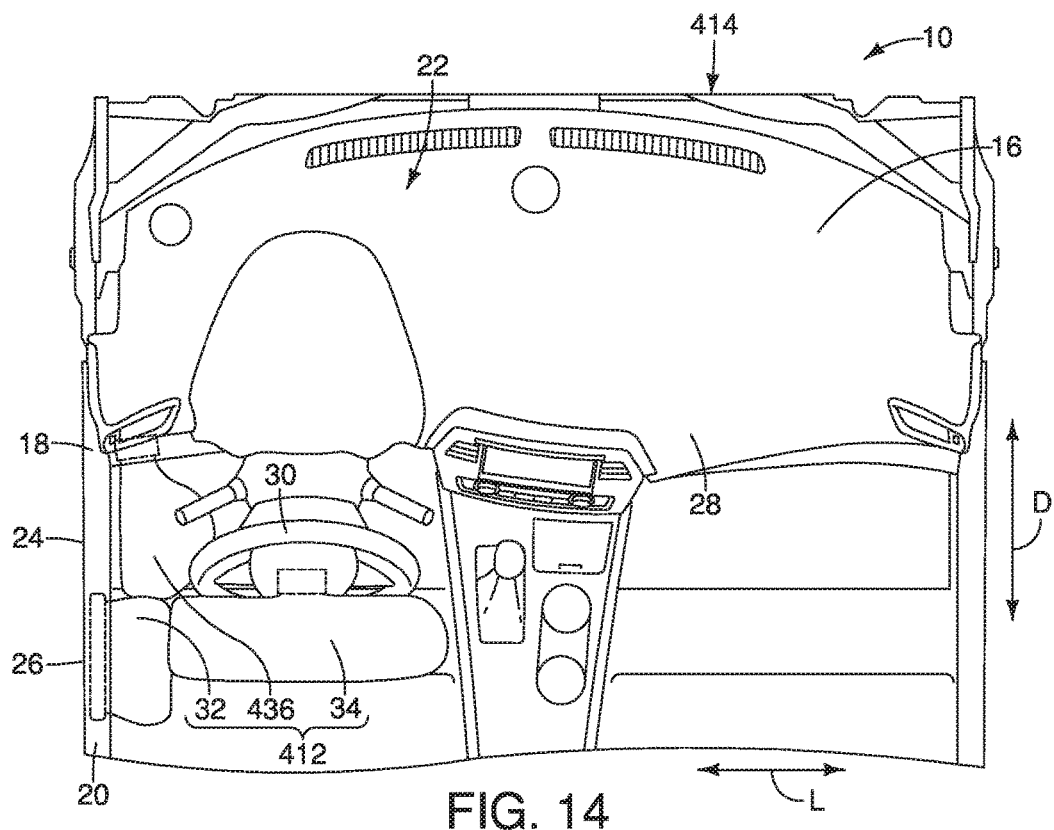
FIG. 14 is a top view of a portion of a vehicle that includes an airbag system having a curtain airbag, a first airbag and an airbag guiding member installed to a portion of an instrument panel below a steering column of the vehicle shown in a deployed orientation in accordance with a fifth embodiment.
Figure 15:
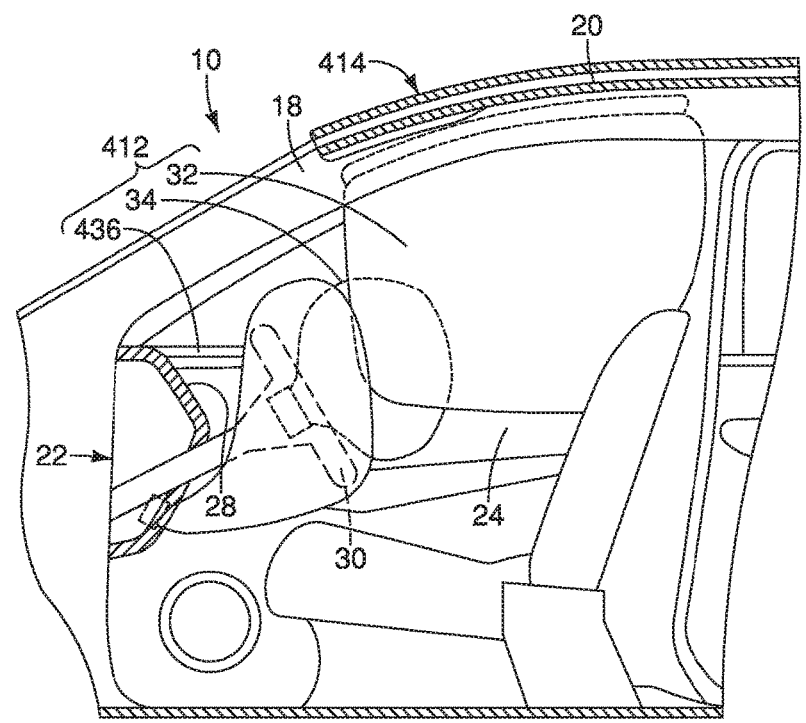
FIG. 15 is an side view of the portion of the passenger compartment of the vehicle depicted in FIG. 14 with a door removed showing locations of the curtain airbag, the first airbag and the airbag guiding member of the airbag system in the deployed orientation in accordance with the fifth embodiment.

Referring now to FIGS. 14 and 15, a vehicle body structure 414 of the vehicle 10 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The vehicle body structure 414 is equipped with an airbag system 412 that includes the curtain airbag 32, the first airbag 34 and an airbag guiding member 436. The curtain airbag 32 and the first airbag 34 are as described above with respect to the first embodiment. The airbag guiding member 436 is a supplemental airbag, hereinafter referred to as the supplemental airbag 436. The supplemental airbag is attached to a lower portion of the instrument panel 26 adjacent to the door 24 and below the steering column 30. In the fifth embodiment, the supplemental airbag 436 is configured to deploy in an upward direction contacting both the curtain airbag 32 and the first airbag 34 such that upon deployment the supplemental airbag 436 inflates against a forward portion of the curtain airbag 32, causing the curtain airbag 32 to move toward the first airbag 34. The supplemental airbag 436 has the similar effects as the supplemental airbag 36 of the first embodiment.

The various vehicle components and structures of the vehicle 10 (other than the vehicle airbag system 12) are conventional components that are well known in the art. Since vehicle components and structures are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle airbag system. Accordingly, these terms, as utilized to describe the present invention should be interpreted relative to a vehicle equipped with the vehicle airbag system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle airbag system, comprising:
   a vehicle body structure that defines a passenger compartment and includes an A-pillar, a roof structure, a forward structure of the passenger compartment and a door that moves between an open orientation exposing the passenger compartment and a closed orientation that conceals at least a portion of the passenger compartment;
   a curtain airbag installed to the vehicle body structure within the passenger compartment along at least one of the A-pillar and the roof structure, the curtain airbag being configured to move from a stowed orientation concealed along the at least one of the A-pillar and the roof structure, to an inflated orientation covering at least a window section of the door and a portion of the A-pillar;
   a first airbag installed to the forward structure within the passenger compartment, the first airbag being configured to move from a stowed orientation concealed within the forward structure, to an inflated orientation covering at least a portion of the forward structure; and
   a trim panel installed to one of a side area of the forward structure adjacent to the door, a forward area of the door adjacent to the A-pillar and the A-pillar, the trim panel being configured to move from a stowed orientation along one of the side area of the forward structure, the forward area of the door and the A-pillar, to a deployed orientation in which the trim panel is positioned to guide the curtain airbag and the first airbag into contact with one another as the curtain airbag and the first airbag move to their respective inflated orientations upon deployment.

2. The vehicle airbag system according to claim 1, wherein
   the forward structure is defined by one of the following:
      an instrument panel that extends along a forward area of the passenger compartment, and
      a steering column assembly that extends rearward from the forward area of the passenger compartment and/or the instrument panel, the steering column assembly having a steering wheel assembly supported at a rearward end thereof.

3. The vehicle airbag system according to claim 2, wherein
   the trim panel is installed to a side area of the instrument panel adjacent to the door and configured such that in the stowed orientation the trim panel is flush with adjacent surfaces of the instrument panel and in the deployed orientation the trim panel is moved rearward away from the adjacent surfaces of the instrument panel.

4. The vehicle airbag system according to claim 2, wherein
   the trim panel is installed to the door adjacent to the A-pillar and configured such that in the stowed orientation the trim panel is flush with adjacent surfaces of the door and in the deployed orientation the trim panel is moved inboard and upward away from the adjacent surfaces of the door.

5. The vehicle airbag system according to claim 2, wherein
   the trim panel is installed to the A-pillar between the door and the instrument panel and configured such that in the stowed orientation the trim panel is flush with adjacent surfaces of the A-pillar and in the deployed orientation the trim panel is moved rearward away from the adjacent surfaces of the A-pillar.

6. A vehicle airbag system, comprising:
   a vehicle body structure that defines a passenger compartment and includes an A-pillar, a roof structure, a forward structure of the passenger compartment and a door that moves between an open orientation exposing the passenger compartment and a closed orientation that conceals at least a portion of the passenger compartment;
   a curtain airbag installed to the vehicle body structure within the passenger compartment along at least one of the A-pillar and the roof structure, the curtain airbag being configured to move from a stowed orientation concealed within the one of the A-pillar and the roof structure, to an inflated orientation covering at least a window section of the door and a portion of the A-pillar;
   a first airbag installed to the forward structure within the passenger compartment, the first airbag being configured to move from a stowed orientation concealed within the forward structure, to an inflated orientation covering at least a portion of the forward structure; and
   a supplemental airbag installed to one of a side area of the forward structure adjacent to the door, a forward area of the door adjacent to the A-pillar and the A-pillar, the supplemental airbag being configured to move from a stowed orientation concealed within one of the side area of the forward structure, the forward area of the door and the A-pillar, to an inflated orientation in which the supplemental airbag is positioned to guide the curtain airbag and the first airbag into contact with one another as the curtain airbag and the first airbag move to their respective inflated orientations, the supplemental airbag being spaced apart from and separate from the curtain airbag, and, spaced apart from and separate from the first airbag in the stowed orientation.

7. The vehicle airbag system according to claim 6, wherein
   the forward structure is defined by one of the following:

an instrument panel that extends along the forward area of the passenger compartment, and a steering column assembly that extends rearward from the forward area of the passenger compartment and/or the instrument panel, the steering column having a steering wheel assembly supported at a rearward end thereof.

8. The vehicle airbag system according to claim 7, wherein the supplemental airbag is installed to a side area of the instrument panel adjacent to the A-pillar and is inflated upon deployment.

9. The vehicle airbag system according to claim 7, wherein the supplemental airbag is installed to a lower section of the A-pillar adjacent to a side area of the instrument panel and is inflated upon deployment.

10. The vehicle airbag system according to claim 7, wherein the supplemental airbag is installed to an upper forward section of the door adjacent to the A-pillar and a side area of the instrument panel and is concealed by a trim panel that is movable upon deployment of the supplemental airbag.

11. The vehicle airbag system according to claim 6, wherein the supplemental airbag is configured and dimensioned to inflate upon deployment filling a space along the A-pillar adjacent to a side area of the forward structure thereby preventing the curtain airbag and the first airbag from inflating into the space along the A-pillar.

* * * * *